US010023306B2

(12) United States Patent
Eglin (10) Patent No.: US 10,023,306 B2
(45) Date of Patent: Jul. 17, 2018

(54) METHOD OF AUTOMATICALLY CONTROLLING A ROTARY WING AIRCRAFT HAVING AT LEAST ONE PROPULSION PROPELLER, AN AUTOPILOT DEVICE, AND AN AIRCRAFT

(75) Inventor: Paul Eglin, Roquefort-la Bedoule (FR)

(73) Assignee: Airbus Helicopters, Marignane (FR)

( * ) Notice: Subject to any disclaimer, the term of this patent is extended or adjusted under 35 U.S.C. 154(b) by 474 days.

(21) Appl. No.: 13/543,957

(22) Filed: Jul. 9, 2012

(65) Prior Publication Data

US 2013/0175385 A1 Jul. 11, 2013

(30) Foreign Application Priority Data

Jul. 12, 2011 (FR) ..................................... 11 02191

(51) Int. Cl.
  *G05D 1/08* (2006.01)
  *B64C 27/57* (2006.01)
  *B64D 45/00* (2006.01)
  *B64C 27/22* (2006.01)

(52) U.S. Cl.
  CPC .............. *B64C 27/57* (2013.01); *B64C 27/22* (2013.01); *B64D 45/00* (2013.01); *G05D 1/0858* (2013.01)

(58) Field of Classification Search
  CPC . B64C 2027/8236; B64C 27/57; B64C 27/82; B64C 27/22; B64C 27/52; B64C 27/025; G06F 17/30867; G06F 17/30902; G05D 1/0858; G05D 1/102; G05D 1/0638; G05D 1/085
  USPC ...... 244/181, 185, 186, 17.13, 17.25; 701/3, 701/5, 6, 7, 11, 14
  See application file for complete search history.

(56) References Cited

U.S. PATENT DOCUMENTS 1,957,277 A * 5/1934 Leray .................... B64C 35/006
  244/15
1,996,750 A * 4/1935 De La Cierva ....... B64C 27/025
  244/8

(Continued)

FOREIGN PATENT DOCUMENTS

WO 9950611 A1 10/1999

OTHER PUBLICATIONS

Search Report and Written Opinion; Application No. FR 1102191; dated Feb. 1, 2012.

(Continued)

*Primary Examiner* — Medhat Badawi
(74) *Attorney, Agent, or Firm* — Brooks Kushman P.C.

(57) ABSTRACT

An autopilot device (10) and method for automatically piloting a rotary wing aircraft (1), having at least one propulsion propeller (2), said rotary wing comprising at least one rotor (3) with a plurality of blades (3'), said device comprising a processor unit (15) co-operating with at least one collective control system (7) for controlling the collective pitch of said blades (3'). The device includes engagement means (20) connected to the processor unit (15) for engaging an assisted mode of piloting for maintaining an angle of attack, said processor unit (15) automatically controlling the collective pitch of the blades (3') when the assisted mode of piloting for maintaining an angle of attack is engaged by controlling said collective control system to maintain an aerodynamic angle of attack ($\alpha$) of the aircraft at a reference angle of attack ($\alpha^*$).

17 Claims, 2 Drawing Sheets

(56) References Cited

U.S. PATENT DOCUMENTS

| | | | | | |
|---|---|---|---|---|---|
| 3,503,572 | A | * | 3/1970 | Hafner | B64C 29/0033 244/207 |
| 4,764,872 | A | * | 8/1988 | Miller | G05D 1/0638 244/181 |
| 4,913,376 | A | * | 4/1990 | Black | B64C 27/02 244/17.11 |
| 5,123,613 | A | * | 6/1992 | Piasecki | B64C 27/82 244/17.13 |
| 5,131,603 | A | * | 7/1992 | Meyers | B64C 27/82 239/265.19 |
| 6,089,501 | A | * | 7/2000 | Frost | B64C 27/021 244/17.11 |
| 6,145,428 | A | * | 11/2000 | Gold | F41G 9/002 244/17.13 |
| 6,592,071 | B2 | * | 7/2003 | Kinkead et al. | 244/7 R |
| 6,885,917 | B2 | * | 4/2005 | Osder et al. | 701/3 |
| 7,137,591 | B2 | * | 11/2006 | Carter et al. | 244/17.27 |
| 7,677,492 | B1 | * | 3/2010 | Carter, Jr. | B64C 27/022 244/17.11 |
| 7,967,239 | B2 | * | 6/2011 | Cotton et al. | 244/17.19 |
| 8,186,629 | B2 | * | 5/2012 | Queiras | B64C 27/26 244/17.13 |
| 8,271,151 | B2 | * | 9/2012 | Hasan | B64C 13/00 701/3 |
| 8,694,182 | B2 | * | 4/2014 | Cherepinsky | B64C 19/00 701/4 |
| 8,960,594 | B2 | * | 2/2015 | Groen | B64C 27/025 244/17.11 |
| 2002/0011539 | A1 | * | 1/2002 | Carter, Jr. | B64C 27/02 244/6 |
| 2003/0057331 | A1 | * | 3/2003 | Kinkead | G05D 1/102 244/194 |
| 2004/0075017 | A1 | * | 4/2004 | Sash | B64C 3/385 244/10 |
| 2004/0093130 | A1 | * | 5/2004 | Osder | B64C 27/18 701/3 |
| 2004/0232280 | A1 | * | 11/2004 | Carter | B64C 27/52 244/17.25 |
| 2006/0138277 | A1 | * | 6/2006 | Franceschini | G05D 1/0646 244/17.13 |
| 2006/0269413 | A1 | * | 11/2006 | Cotton | B64C 27/10 416/170 R |
| 2007/0125907 | A1 | * | 6/2007 | Lappos | B64C 27/14 244/60 |
| 2008/0237392 | A1 | * | 10/2008 | Piasecki | B64C 27/26 244/6 |
| 2008/0294305 | A1 | * | 11/2008 | Roesch | B64C 27/22 701/3 |
| 2009/0216392 | A1 | * | 8/2009 | Piasecki | B64C 15/12 701/3 |
| 2009/0321554 | A1 | * | 12/2009 | Roesch | B64C 27/26 244/6 |
| 2010/0012769 | A1 | * | 1/2010 | Alber | B64C 27/10 244/17.23 |
| 2010/0065677 | A1 | * | 3/2010 | Ferrier | B64C 27/26 244/6 |
| 2010/0219286 | A1 | * | 9/2010 | Roesch | B64C 27/26 244/6 |
| 2010/0224720 | A1 | * | 9/2010 | Roesch | B64C 27/26 244/12.3 |
| 2010/0308178 | A1 | * | 12/2010 | Gemmati | B64C 13/28 244/230 |
| 2011/0022250 | A1 | * | 1/2011 | Hamburg | G05D 1/102 701/11 |
| 2011/0024551 | A1 | * | 2/2011 | Biest | B64C 13/46 244/6 |
| 2011/0040431 | A1 | * | 2/2011 | Griffith | G05D 1/0661 701/15 |
| 2012/0034080 | A1 | * | 2/2012 | Agrawal | B64C 27/22 416/1 |
| 2012/0160954 | A1 | * | 6/2012 | Thomassey | B64C 27/82 244/17.13 |
| 2012/0175461 | A1 | * | 7/2012 | van der Westhuizen | B64C 27/025 244/17.25 |
| 2012/0181378 | A1 | * | 7/2012 | Birkner | B64C 27/025 244/17.11 |
| 2013/0082135 | A1 | * | 4/2013 | Moret | B64C 27/12 244/6 |
| 2013/0175385 | A1 | * | 7/2013 | Eglin | G05D 1/0858 244/17.13 |
| 2015/0012154 | A1 | * | 1/2015 | Senkel | B64D 17/80 701/4 |
| 2018/0065737 | A1 | * | 3/2018 | Kroo | B64C 29/00 |
| 2018/0072411 | A1 | * | 3/2018 | Eglin | B64D 45/00 |

OTHER PUBLICATIONS

European Search Report for European Application No. 12004693.3, Completed by the European Patent Office, dated Nov. 12, 2012, 7 Pages.

* cited by examiner

METHOD OF AUTOMATICALLY CONTROLLING A ROTARY WING AIRCRAFT HAVING AT LEAST ONE PROPULSION PROPELLER, AN AUTOPILOT DEVICE, AND AN AIRCRAFT

CROSS REFERENCE TO RELATED APPLICATIONS

This application claims priority to FR 11 02191 filed on Jul. 12, 2011, the disclosure of which is incorporated in its entirety by reference herein.

BACKGROUND OF THE INVENTION (1) Field of the Invention

The present invention relates to a method of and device for automatically controlling a rotary wing aircraft having at least one propulsion propeller, to an autopilot device, and to an aircraft.

(2) Description of Related Art

The term "aircraft" includes in particular rotorcraft, i.e. aircraft provided with a rotary wing, and including helicopters.

For example, a helicopter comprises a rotary wing that includes at least one main rotor for providing the helicopter with propulsion and lift.

The longitudinal attitude and thus the pitching angle of the helicopter are then necessarily a function of the travel speed of the helicopter. At high speed, a helicopter thus presents a considerable pitching angle, and consequently a strongly nose-down longitudinal attitude.

It can be understood that at high speed, the helicopter presents a large nose-down aerodynamic angle of attack, which angle of attack generates penalizing aerodynamic drag.

It should be recalled that the longitudinal attitude of a rotorcraft represents the pitching angle of said rotorcraft, i.e. the angle between the reference longitudinal axis of the rotorcraft and the orthogonal projection of said longitudinal reference axis onto a plane normal to the gravity direction.

In contrast, the aerodynamic angle of attack of a rotorcraft represents the angle between the longitudinal reference axis of the rotorcraft and the orthogonal projection of the air speed vector of the rotorcraft onto a vertical plane containing said longitudinal axis.

Finally, the term "air-path slope" designates the angle of the air speed vector of said aircraft relative to its orthogonal projection onto a plane normal to the gravity direction.

Under such circumstances, the longitudinal attitude of a rotorcraft is equal to the algebraic sum of the angle of attack plus the air-path slope of the aircraft.

Furthermore, certain rotorcraft are also provided with at least one propulsion propeller.

It then becomes possible to adjust independently the longitudinal forward speed, the vertical speed, and the longitudinal attitude of such a rotorcraft.

It should be observed that the state of the art includes the document US 2011/0040431, and also the document US 2008/0237392 that describes a rotary wing aircraft having a propulsion propeller.

According to document US 2008/0237392, a subsystem of a control architecture provides vertical control and pitching control of the aircraft.

Document WO 99/50611 forms part of a state of the art that is remote from the invention, that document WO 99/50611 relating to a control and firing system.

BRIEF SUMMARY OF THE INVENTION

The present invention thus seeks to propose a method of facilitating the workload on a pilot of a rotary wing aircraft having at least one propulsion propeller, the method possibly serving to minimize the aerodynamic drag of the aircraft.

The invention thus provides a method of automatically controlling an aircraft, the aircraft having a rotary wing and at least one propulsion propeller, the rotary wing comprising at least one rotor provided with a plurality of blades.

This method is remarkable in particular in that during an assisted mode of piloting for maintaining an angle of attack, the aerodynamic angle of attack of the aircraft is maintained equal to a reference angle of attack by automatically controlling the collective pitch of said blades.

The workload on the pilot is thus lightened, the pilot possibly concentrating solely on controlling two parameters, i.e. the longitudinal attitude and the longitudinal forward speed, for example, rather than controlling three parameters. In addition, the pilot can maneuver the aircraft by calling for an angle of attack that is optimized to minimize the aerodynamic drag of the aircraft.

It should be understood that the term "maintaining the angle of attack of the aircraft equal to a reference angle of attack" is used to mean that the aerodynamic angle of attack of the aircraft tends to be maintained equal to a reference angle of attack. As soon as the aerodynamic angle of attack of the aircraft is no longer equal to the reference angle of attack, then action is taken on the collective pitch of the blades in order to correct that situation.

Conversely, it should be observed that document US 2008/0237392 makes no reference to an angle of attack.

Furthermore, document WO 99/50611 does not suggest an assisted mode for maintaining an angle of attack in order to maintain the angle of attack of the aircraft equal to a setpoint, but rather it relates to a mode of maintaining altitude during which the angle of attack must not exceed a limit so as to make firing possible.

The mode of the invention for maintaining an angle of attack does not seek to maintain the altitude of the aircraft constant, but to maintain the angle of attack of the aircraft constant.

The method may also include one or more of the following characteristics.

For example, the collective pitch of the blades may be controlled automatically so as to control a vertical air speed of the aircraft in such a manner as to maintain the aerodynamic angle of attack of the aircraft equal to a reference angle of attack in application of the following relationship:

$$\alpha^* = \theta - \arcsin(VZ/TAS)$$

where "VZ" represents the vertical air speed of the aircraft, "TAS" represents the true air speed of the aircraft, "$\theta$" represents a current longitudinal attitude, and "$\alpha^*$" represents the reference angle of attack.

On such an aircraft, the system of parameters including the longitudinal air speed, the vertical air speed, and the longitudinal attitude may be replaced by an alternative system including the true air speed of the aircraft, the longitudinal attitude, and the aerodynamic angle of attack of the aircraft.

The air-path slope of the aircraft may then be obtained using the following relationship:

$$\gamma = \arcsin(VZ/TAS)$$

where "γ" represents the air-path slope, "VZ" represents the vertical air speed of the aircraft, and "TAS" represents the true air speed.

According to the invention, the following equation is deduced therefrom:

$$\alpha^* = \theta - \arcsin(VZ/TAS)$$

where "VZ" represents the vertical air speed of the aircraft, "TAS" represents the true air speed, "θ" represents the current longitudinal attitude, and "α*" represents the aerodynamic angle of attack.

For a given longitudinal attitude, by controlling the collective pitch of the blades, the vertical air speed is modified and thus the aerodynamic angle of attack of the aircraft is modified.

If the forward speed of the aircraft varies and thus if its true air speed varies, or if the current longitudinal attitude varies, then the collective pitch of the blades is modified automatically in order to maintain the aerodynamic angle of attack of the aircraft equal to the reference angle of attack.

According to another aspect, the reference angle of attack may be equal to the current aerodynamic angle of attack of the aircraft at the moment that the assisted mode of piloting for maintaining an angle of attack is engaged.

This method is then simple, the pilot needing only to adjust a reference angle of attack prior to engaging the assisted mode of piloting for maintaining an angle of attack.

Furthermore, it is possible to modify the value of the reference angle of attack in flight.

Thus, a pilot may adjust the reference angle of attack if the pilot finds that necessary.

A new reference angle of attack may be determined using adjustment means, such as:

a knob arranged on a collective pitch control of a control pitch control system for controlling the collective pitch of the blades of the rotary wing, the knob serving to increase or decrease the collective pitch of the blades when the assisted mode of piloting for maintaining an angle of attack is not engaged;
  control means dedicated to this application; and
  a knob for engaging a trim actuator arranged on the collective pitch control system for the blades of the rotary wing, the current angle of attack at the moment the trim actuator is engaged becoming the reference angle of attack.

It should be observed that in a first implementation, the pilot acts on the longitudinal attitude of the aircraft by controlling the cyclic pitch of the blades of the rotary wing. Since the aerodynamic angle of attack is maintained at a reference angle of attack, by controlling the longitudinal attitude using a cyclic flight control associated with at least one cyclic control system for controlling the cyclic pitch of the blades of the rotary wing, the pilot modifies the air-path slope of the aircraft. This provides advantageous piloting comfort.

It should be understood that the term "cyclic flight control" covers a flight control acting on the cyclic pitch of the blades of the rotary wing.

In a second implementation, the longitudinal attitude may be maintained automatically equal to a longitudinal reference attitude.

In this second implementation, the aircraft thus has an automatic system for maintaining the longitudinal attitude equal to a reference attitude. The reference attitude may be the current attitude of the aircraft at the moment the attitude maintaining system is engaged, or it may be a reference attitude set by means of a knob, for example.

The automatic system may be an autopilot system known as an automatic flight control system (AFCS).

It can be understood that in the following equation:

$$\alpha^* = \theta^* - \arcsin(VZ/TAS)$$

"θ*" represents the reference longitudinal attitude.

In one option, the reference longitudinal attitude is automatically kept constant when a pilot operates a cyclic flight control to modify the longitudinal attitude.

If the pilot seeks to act on a cyclic flight control associated with at least one cyclic control system for controlling the cyclic pitch of the blades of the rotary wing in order to modify the longitudinal attitude, then in a basic variant the attitude is no longer maintained at a reference attitude by the attitude-maintaining system.

Under such circumstances, when the pilot ceases to act on the cyclic flight control, the automatic system for maintaining attitude is automatically engaged, with the reference attitude being the reference attitude as stored prior to the action of the pilot on the cyclic flight control.

Consequently, in this basic version, the reference attitude is not modified when the pilot operates a longitudinal cyclic flight control in order to control the longitudinal attitude manually, but the automatic system for maintaining attitude is inhibited.

In a tactical version, the reference longitudinal attitude is automatically servo-controlled to the current value of the longitudinal attitude whenever a pilot operates a longitudinal cyclic flight control to modify the longitudinal attitude.

Under such circumstances, when the pilot is no longer acting on said cyclic flight control, the automatic system for maintaining attitude is automatically engaged, with the reference attitude being the attitude that is current at the time the attitude-maintaining system re-engages.

Similarly, and optionally, the aerodynamic angle of attack of the aircraft is no longer maintained equal to a reference angle of attack when the pilot acts on a collective flight control for controlling the collective pitch of said blades of the rotary wing.

It should be observed that it is possible, for example, to use force rods arranged in control linkages in order to determine whether or not a pilot is operating a flight control.

Furthermore, the reference angle of attack may be bounded.

For safety reasons, out-of-range or dangerous values are not stored by bounding the reference angle of attack to a range of −4° to +4°, for example.

In another aspect, a first symbol representing a reference air speed vector may be displayed on an artificial horizon so that a pilot can visualize a reference air-path slope and the reference angle of attack.

In a first implementation, the longitudinal attitude is controlled by the pilot of the aircraft, the angle between the current attitude displayed on the artificial horizon and the reference air speed vector then actually illustrating the reference angle of attack.

In the second implementation, a second symbol representing a reference longitudinal attitude is displayed on the artificial horizon.

The angle between the first symbol and the second symbol then in fact represents the reference angle of attack.

Furthermore, it is possible to envisage displaying a third symbol on the artificial horizon representing the current air speed, the current air speed vector representing the current air-path slope of the aircraft.

Furthermore, it is possible to envisage displaying a fourth symbol on the artificial horizon representing the current ground speed vector, the current ground speed vector representing the current ground slope of the aircraft.

Optionally, when at least one symbol is displayed on an artificial horizon in order to illustrate the reference angle of attack, the color of the symbol may be modified whenever automatic control of the collective pitch of the blades in order to maintain said reference angle of attack requires power greater than a threshold power, and the reference angle of attack may be modified automatically in order to comply with said threshold power.

Since the invention seeks to maintain the aerodynamic angle of attack at a reference angle of attack by acting on the collective pitch of the blades of the rotary wing, there is a risk of going outside the range of powers allocated to the rotary wing.

In such a configuration, the reference angle of attack is modified so that the situation does not occur, and the pilot is informed by changing the color of at least one symbol illustrating the reference angle of attack.

For a rotary wing aircraft also having at least one fixed wing, it should be observed that the symbols displayed for illustrating the reference angle of attack or the current angle of attack enable the angle of attack of the fixed wing of the aircraft to be evaluated and thus make it possible to avoid said fixed wing stalling.

In addition to a method, the invention also provides a device implementing the method.

The invention thus provides an autopilot device for automatically piloting a rotary wing aircraft, the aircraft having at least one propulsion propeller, the rotary wing comprising at least one rotor with a plurality of blades, the device comprising a processor unit co-operating with at least one collective control system for controlling the collective pitch of said blades.

This device is remarkable in particular in that it includes engagement means connected to the processor unit for engaging an assisted mode of piloting for maintaining an angle of attack, the processor unit automatically controlling the collective pitch of the blades when the assisted mode of piloting for maintaining an angle of attack is engaged by controlling the collective control system to maintain an aerodynamic angle of attack of the aircraft at a reference angle of attack.

The device may also include one or more of the following additional characteristics.

The processor unit automatically controlling the collective pitch of said blades for controlling a vertical air speed of the aircraft in such a manner as to maintain the angle of attack of the aircraft equal to a reference angle of attack in compliance with the following relationship:

$$\alpha^* = \theta - \arcsin(VZ/TAS)$$

where "VZ" represents the vertical air speed of the aircraft, "TAS" represents the true air speed of the aircraft, "$\theta$" represents a current longitudinal attitude of the aircraft, and "$\alpha^*$" represents the reference angle of attack, the device may comprise a set of means connected to the processor unit in order to determine the vertical air speed of the aircraft, the true air speed of the aircraft, and the current longitudinal attitude.

For example, the set of means may possess:
- conventional first means for determining the true air speed by using a Pitot tube or the like;
- conventional second means for determining the longitudinal attitude by implementing an attitude heading reference system; and
- third conventional means for determining the vertical air speed by implementing a static pressure takeoff.

In another aspect, the device may include adjustment means connected to the processor unit for adjusting the reference angle of attack.

Furthermore, the device may include an automatic system for maintaining a longitudinal attitude of the aircraft equal to a reference attitude, the automatic system co-operating with at least one longitudinal cyclic control system for controlling the cyclic pitch of the blades of the rotary wing.

In a variant, the automatic system may comprise a dedicated computer.

In another variant, the processor unit acts as the automatic system. The processor unit then has authority over the cyclic and collective pitch control systems for the blades.

In addition, the device may include a display connected to the processor unit to display at least one symbol illustrating the reference angle of attack.

Finally, the invention provides a rotary wing aircraft having at least one propulsion propeller, the aircraft having an autopilot device as described above.

BRIEF DESCRIPTION OF THE SEVERAL VIEWS OF THE DRAWINGS

The invention and its advantages appear in greater detail from the following description of embodiments given by way of illustration with reference to the accompanying FIGURES, in which.

Elements present in more than one of the figures are given the same references in each of them.

DETAILED DESCRIPTION OF THE INVENTION

Figure 1:
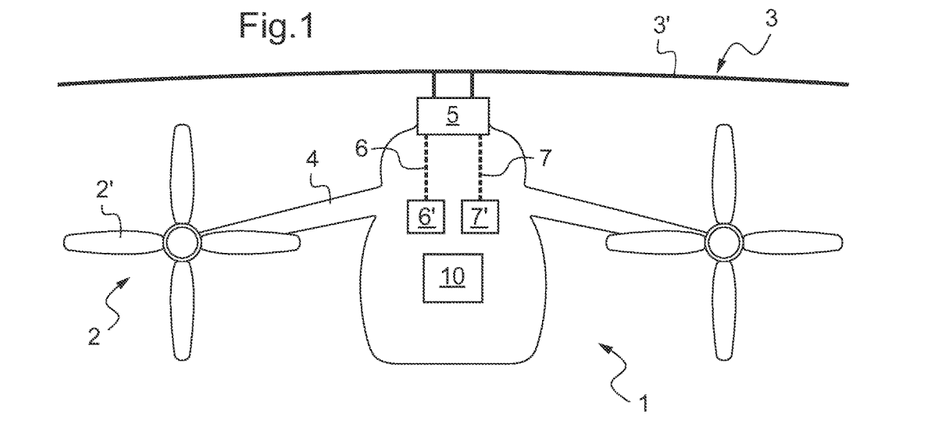
FIG. 1 is a diagram showing an aircraft.

FIG. 1 shows an aircraft 1 having a rotary wing and at least one propulsion propeller 2.

Each propulsion propeller 2 has a plurality of first blades 2', in particular for contributing to the propulsion of the aircraft. It should also be observed that the aircraft may also be provided with a fixed wing 4. The propulsion propellers 2 can be arranged on said fixed wing 4.

Furthermore, the rotary wing 3 comprises at least one rotor 3 having a plurality of second blades 3', sometimes referred to merely as "blades 3'".

Under such circumstances, the aircraft includes adjustment means 5 for adjusting the pitch of the second blades 3', the adjustment means 5 possibly having at least three servo-controls (not shown) for modifying the collective pitch and the cyclic pitch of the second blades 3'.

If the servo-controls extend or retract by the same amount, then the collective pitch of the blades 3' is modified. In contrast, if one servo-control behaves differently from the others, then the cyclic pitch of the second blades 3' is modified. Reference may be made to the literature, if necessary, in order to obtain additional information relating to the collective pitch and the cyclic pitch of a rotorcraft rotor.

For manual control of the collective pitch of the second blades 3', the aircraft includes a collective control system 7 connected to the adjustment means. The collective control system 7 then co-operates with a collective flight control 7', e.g. of the collective pitch lever type.

Furthermore, for manual control of the cyclic pitch of the second blades 3', the aircraft includes at least one cyclic control system 6 connected to the adjustment means. Each cyclic control system 6 then co-operates with a cyclic flight control 6', e.g. of the cyclic stick type.

Thus, a longitudinal cyclic control system makes it possible to request a modification to the longitudinal trim of the aircraft 1.

Furthermore, the aircraft 1 is also provided with an autopilot device 10 that co-operates with the control systems, in particular via parallel actuators or trim actuators that are relatively slow but that can move through a large amplitude, and/or via series actuators that are relatively fast but that can move through only a small amplitude.

The device 10 may also co-operate with an electrical or optical flight control system.

Figure 2:
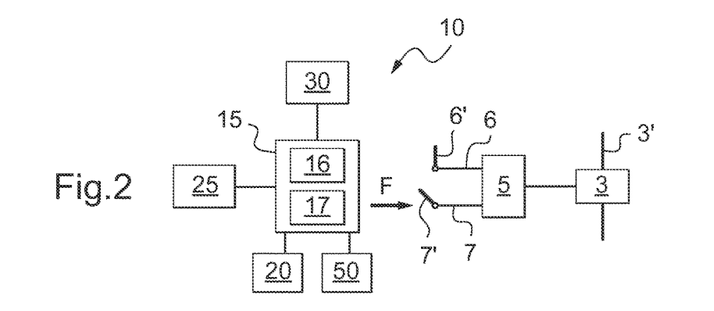
FIGS. 2 and 3 are diagrams showing a first embodiment.

FIG. 2 shows a device 10 in a first embodiment.

Independently of the embodiment, the device 10 comprises a processor unit 15. The processor unit may comprise calculation means 16 that execute instructions stored in a memory 17.

As represented by arrow F, the processor unit 15 is then suitable in particular for controlling a collective control system 7 in order to modify the collective pitch of the second blade 3', e.g. by controlling a parallel actuator and/or a series actuator of said collective control system 7.

To this end, the processor unit 15 may be connected to engagement means 20 for engaging an assisted mode of piloting for maintaining an angle of attack.

During this assisted mode of piloting for maintaining an angle of attack, the aerodynamic angle of attack $\alpha$ of the aircraft is automatically maintained equal to a reference angle of attack $\alpha^*$ by automatically controlling the collective pitch of said second blades 3'. It can be understood that the term "the aerodynamic angle of attack $\alpha$ of the aircraft is automatically maintained equal to a reference angle of attack $\alpha^*$" means that the collective pitch of the blades is servo-controlled so that the current aerodynamic angle of attack of the aircraft tends towards the reference angle of attack, or else is equal to said reference angle of attack.

Thus, when a pilot requests implementation of the assisted mode of piloting for maintaining an angle of attack by manipulating the engagement means 20, the processor unit 15 automatically controls the collective pitch of the blades 3 by controlling said collective control system so as to maintain an aerodynamic angle of attack $\alpha$ of the aircraft equal to a reference angle of attack $\alpha^*$.

The reference angle of attack $\alpha^*$ may be equal to the current aerodynamic angle of attack $\alpha$ of the aircraft 1 at the moment the assisted mode of piloting for maintaining an angle of attack is engaged.

Nevertheless, it is possible to act manually to modify the value of the reference angle of attack $\alpha^*$ in flight.

The device 10 may include adjustment means 50 operable by a pilot to define said value for the reference angle of attack $\alpha^*$.

Independently of the version, it should be observed that the reference angle of attack may be bounded by the processor unit 15.

In addition, the device 10 may include a display 30 connected to the processor unit 15 in order to display at least one symbol representing the reference angle of attack $\alpha^*$.

In order to control the collective pitch of said second blades 3' automatically, the processor unit 15 may control a vertical air speed of the aircraft in such a manner as to maintain the aerodynamic angle of attack of the aircraft equal to a reference angle of attack using the following relationship:

$$\alpha^* = \theta - \arcsin(VZ/TAS)$$

where "VZ" represents the vertical air speed of the aircraft, "TAS" represents the true air speed of the aircraft, "$\theta$" represents a current longitudinal attitude, and "$\alpha^*$" represents the reference angle of attack.

Under such circumstances, the device 10 has a set of means 25 connected to the processor unit in order to determine the vertical air speed of the aircraft, the true air speed of the aircraft, and the current longitudinal attitude.

In a first embodiment, the pilot acts on the current longitudinal attitude of the aircraft by cyclically controlling the pitch of the second blades 3' of the rotary wing by means of the cyclic flight control 6'.

Figure 3:
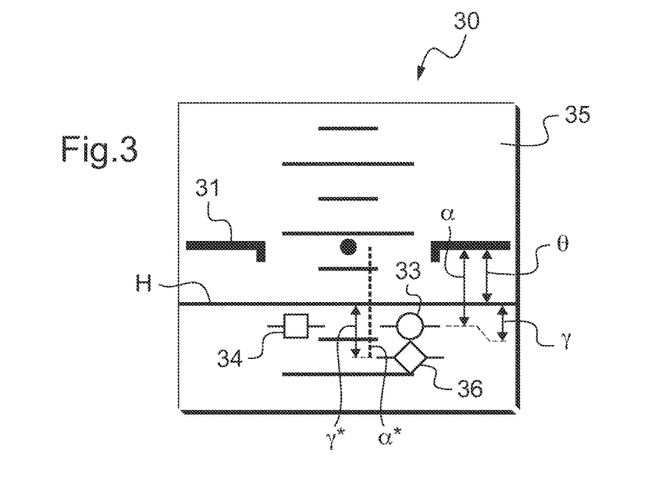

Under such circumstances, and with reference to FIG. 3, the display 30 may comprise an artificial horizon 35 on which there appears a model 31 of the aircraft 1.

The processor unit causes a first symbol 36 to be displayed in order to enable the reference angle of attack to be viewed.

The processor unit 15 determines a reference air-path slope $\gamma^*$ corresponding to a reference air speed vector $V^*$ and it displays a first symbol 36 representing said reference air-path slope $\gamma^*$ and the reference air speed vector $V^*$.

The first symbol 36 is then obtained using the equation:

$$\gamma^* = \theta - \alpha^*$$

Thus, the first space between the model 31 and the horizon H represents the current longitudinal attitude $\theta$, the second space between the horizon H and a third symbol 33 represents the reference air-path slope $\gamma^*$, and the third space between the model 31 and the third symbol 33 represents the reference angle of attack $\alpha^*$.

The pilot can thus easily see this reference angle of attack.

It should also be observed that the processor unit may cause a symbol that is referred for convenience as the "third" symbol 33 to be displayed in order to represent the current air speed vector of the aircraft. The fourth space between the horizon H and the third symbol 33 then represents the current air-path slope, the fifth space between the model 31 and the third symbol 33 representing the current aerodynamic angle of attack $\alpha$.

Furthermore, the processor unit may cause a fourth symbol 34 to be displayed that represents the ground speed vector. The sixth space between the horizon H and the fourth symbol 34 then represents the current ground speed.

Figure 4:
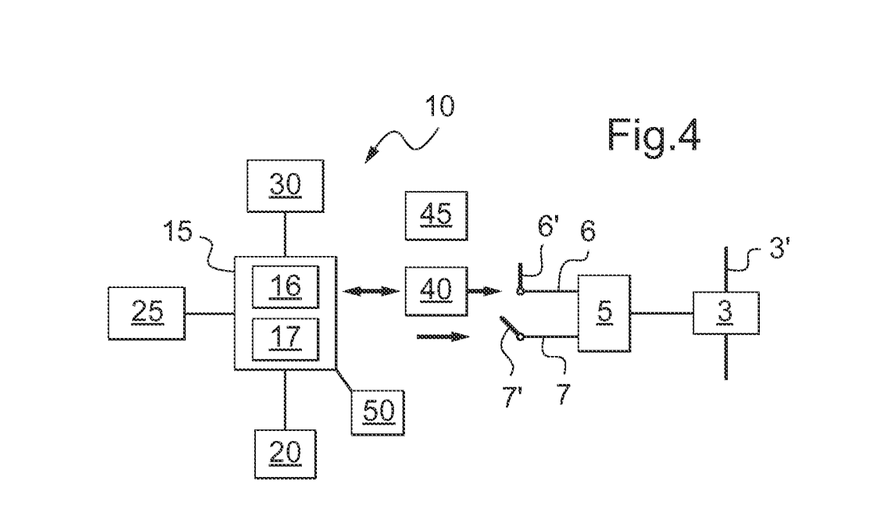
FIGS. 4 and 5 are diagrams showing a second embodiment.

With reference to FIG. 4, in the second embodiment, the longitudinal attitude $\theta$ is automatically maintained equal to a reference longitudinal attitude $\theta^*$. The current longitudinal attitude is then equal to the reference attitude.

Consequently, the device 10 then controls an automatic system 40 to maintain a longitudinal attitude of the aircraft equal to a reference attitude. The device 10 may include an adjustment member 45 for adjusting the reference attitude, and indeed an engagement member for this embodiment.

It can be understood that the term "for maintaining a longitudinal attitude of the aircraft equal to a reference attitude" means that the longitudinal cyclic pitch of the blades 3'is servo-controlled so that the current longitudinal attitude of the aircraft tends towards the reference attitude, or indeed is equal to said reference attitude.

The automatic system 40 co-operates with at least one longitudinal cyclic control system 6 for controlling the cyclic pitch of the blades of the rotary wing.

Furthermore, the automatic system may be incorporated in the processor unit 15.

The set of means 25 may also include force sensors present in the longitudinal cyclic control system.

Consequently, in a basic variant, the automatic system 40 does not modify the reference attitude when the pilot operates a longitudinal cyclic flight control in order to control the longitudinal attitude manually. Nevertheless, the automatic system for maintaining the attitude is then inhibited.

When the pilot does not act on the cyclic flight control, the automatic system for maintaining attitude is engaged automatically, the reference attitude being the reference attitude stored before the pilot acted on the cyclic flight control.

In a tactical variant, the reference longitudinal attitude is automatically servo-controlled on the current value of the longitudinal attitude when a pilot operates a longitudinal cyclic flight control for modifying the longitudinal attitude.

Under such circumstances, when the pilot no longer acts on said cyclic flight control, the automatic system for maintaining attitude is engaged automatically, with the reference attitude being the attitude that is current at the time the attitude maintaining system is re-engaged.

Figure 5:
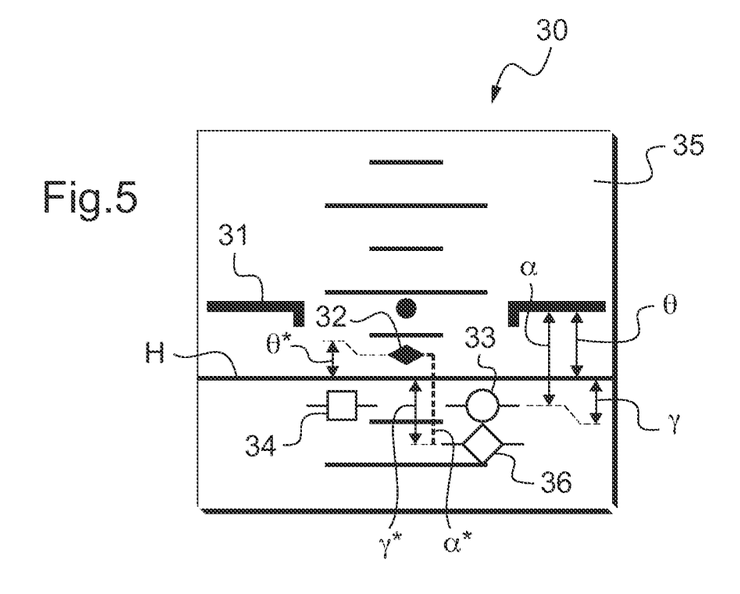

With reference to FIG. 5, in this second embodiment, the processor unit 15 determines a reference air-path slope $\gamma^*$ corresponding to a reference air speed vector $V^*$, and displays a first symbol 36 representing said reference air-path slope $\gamma^*$ and the reference air speed vector $V^*$.

The first symbol 36 is then obtained from the equation:

$$\gamma^*=\theta^*-\alpha^*$$

where $\theta^*$ represents the reference attitude.

Furthermore, the processor unit may cause a second symbol 32 to be displayed to represent the reference attitude $\theta^*$ together with the above-described third symbol.

Thus, the first space between the second symbol 32 and the horizon H represents the reference attitude $\theta^*$, the second space between the horizon H and third symbol 33 represents the reference air-path slope $\gamma^*$, and third space between the second symbol 32 and the third symbol 33 represents the reference angle of attack $\alpha^*$.

The pilot can thus easily visualize this reference angle of attack.

In addition, the processor unit may cause a fourth symbol 34 to be displayed to represent the ground speed vector.

Naturally, the present invention may be subjected to numerous variations as to its implementation. Although several embodiments are described above, it will readily be understood that it is not conceivable to identify exhaustively all possible embodiments. It is possible to envisage replacing any of the means described by equivalent means without going beyond the ambit of the present invention.

What is claimed is:

1. A method of automatically piloting a rotary wing aircraft having at least one propulsion propeller provided with a plurality of propulsion propeller blades configured to contribute to propulsion of the aircraft, a rotary wing independently operable from the propulsion propeller and having a main rotor provided with a plurality of main rotor blades, an adjustment mechanism having a servo-control arrangement configured to adjust pitch of the main rotor blades, a collective control system connected to the adjustment mechanism and configured to control a collective pitch of the main rotor blades via the adjustment mechanism, and a cyclic control system connected to the adjustment mechanism and configured to control a cyclic pitch of the main rotor blades via the adjustment mechanism, the method comprising:

operating by a pilot the propulsion propeller to adjust a longitudinal forward speed of the aircraft;

while the pilot is operating the propulsion propeller to adjust the longitudinal forward speed of the aircraft, automatically controlling, by a processor unit, (i) the collective control system to control the collective pitch of the main rotor blades so as to control a vertical air speed of the aircraft such that the main rotor blades have a collective pitch in which an aerodynamic angle of attack ($\alpha$) of the aircraft is maintained equal to a reference angle of attack ($\alpha^*$) and automatically controlling, by the processor unit, (ii) the cyclic control system to control the cyclic pitch of the main rotor blades such that the main rotor blades have a cyclic pitch in which a longitudinal attitude ($\theta$) of the aircraft is maintained at a reference longitudinal attitude ($\theta^*$);

operating by the pilot the cyclic control system to modify the cyclic pitch of the main rotor blades to adjust the longitudinal attitude ($\theta$) of the aircraft;

while the pilot is operating the cyclic control system to adjust the longitudinal attitude ($\theta$) of the aircraft, automatically controlling, by the processor unit, the collective control system to control the collective pitch of the main rotor blades to control the vertical air speed of the aircraft such that the main rotor blades have a collective pitch in which the aerodynamic angle of attack ($\alpha$) of the aircraft is maintained equal to the reference angle of attack ($\alpha^*$) and servo-controlling automatically, by the processor unit, the reference longitudinal attitude ($\theta^*$) to a current value of the longitudinal attitude ($\theta$) of the aircraft; and wherein the longitudinal attitude ($\theta$) of the aircraft is equal to the sum of the aerodynamic angle of attack ($\alpha$) of the aircraft and an air-path slope of the aircraft, the air-path slope is dependent on the vertical air speed of the aircraft and a true air speed of the aircraft, and the true air speed of the aircraft is dependent on the longitudinal forward speed of the aircraft.

2. The method according to claim 1, wherein the collective pitch of the main rotor blades is controlled automatically so as to control the vertical air speed of the aircraft in such a manner as to maintain the aerodynamic angle of attack ($\alpha$) of the aircraft equal to the reference angle of attack ($\alpha^*$) by application of the following relationship:

$$\alpha^*=\theta-\arcsin(VZ/TAS)$$

where "VZ" represents the vertical air speed of the aircraft, "TAS" represents the true air speed of the aircraft, "$\theta$" represents a current longitudinal attitude, and "$\alpha^*$" represents the reference angle of attack.

3. The method according to claim 1, the method further comprising setting a value of the reference angle of attack ($\alpha^*$) to be equal to the current value of the aerodynamic angle of attack ($\alpha$) of the aircraft at the moment that the longitudinal forward speed of the aircraft is adjusted by the pilot operating the propulsion propeller.

4. The method according to claim 1, the method further comprising modifying a value of the reference angle of attack ($\alpha^*$) in flight.

5. The method according to claim 1, wherein the reference angle of attack ($\alpha^*$) is bounded.

6. The method according to claim 1, the method further comprising displaying a first symbol representing a reference air speed vector on an artificial horizon so that the pilot can visualize a reference air-path slope and consequently the reference angle of attack ($\alpha^*$).

7. The method according to claim 6, the method further comprising displaying a second symbol representing a reference longitudinal attitude ($\theta^*$) on the artificial horizon.

8. The method according to claim 6, the method further comprising displaying a third symbol representing a current air speed vector on the artificial horizon and displaying a fourth symbol representing a current ground speed vector on the artificial horizon.

9. The method according to claim 6, wherein with at least one symbol being displayed on an artificial horizon to illustrate the reference angle of attack ($\alpha^*$), the color of the symbol is modified whenever automatic control of the collective pitch of the main rotor blades in order to maintain the reference angle of attack ($\alpha^*$) requires power greater than a threshold power, and the method further comprising modifying automatically the reference angle of attack ($\alpha^*$) in order to comply with the threshold power.

10. An autopilot device for automatically piloting a rotary wing aircraft having at least one propulsion propeller provided with a plurality of propulsion propeller blades configured to contribute to propulsion of the aircraft, a rotary wing independently operable from the propulsion propeller and having a main rotor with a plurality of main rotor blades, an adjustment mechanism having a servo-control arrangement configured to adjust pitch of the main rotor blades, a collective control system connected to the adjustment mechanism and configured to control a collective pitch of the main rotor blades via the adjustment mechanism, and a cyclic control system connected to the adjustment mechanism and configured to control a cyclic pitch of the main rotor blades via the adjustment mechanism, the device comprising:

a processor unit configured to automatically control the collective control system to control a collective pitch of the main rotor blades;

an automatic system configured to automatically control the cyclic control system to control a cyclic pitch of the main rotor blades;

wherein while a pilot is operating the propulsion propeller to adjust a longitudinal forward speed of the aircraft, the processor unit is configured to automatically control (i) the collective control system to control the collective pitch of the main rotor blades so as to control a vertical air speed of the aircraft such that the main rotor blades have a collective pitch in which an aerodynamic angle of attack ($\alpha$) of the aircraft is maintained at a reference angle of attack ($\alpha^*$) and to automatically control (ii) the cyclic control system to control the cyclic pitch of the main rotor blades such that the main rotor blades have a cyclic pitch in which a longitudinal attitude ($\theta$) of the aircraft is maintained at a reference longitudinal attitude ($\theta^*$);

wherein while the pilot is operating the cyclic control system to modify the cyclic pitch of the main rotor blades to adjust the longitudinal attitude ($\theta$) of the aircraft, the processor unit is configured to automatically control the collective control system to control the collective pitch of the main rotor blades to control the vertical air speed of the aircraft such that the main rotor blades have a collective pitch in which the aerodynamic angle of attack ($\alpha$) of the aircraft is maintained equal to the reference angle of attack ($\alpha^*$) and to servo-control automatically the reference longitudinal attitude ($\theta^*$) to a current value of the longitudinal attitude ($\theta$) of the aircraft and wherein the longitudinal attitude ($\theta$) of the aircraft is equal to the sum of the aerodynamic angle of attack ($\alpha$) of the aircraft and an air-path slope of the aircraft, the air-path slope is dependent on the vertical air speed of the aircraft and a true air speed of the aircraft, and the true air speed of the aircraft is dependent on the longitudinal forward speed of the aircraft.

11. The device according to claim 10, wherein the processor unit automatically controls the collective pitch of the main rotor blades to control the vertical air speed of the aircraft in such a manner as to maintain the aerodynamic angle of attack ($\alpha$) of the aircraft equal to the reference angle of attack ($\alpha^*$) in compliance with the following relationship:

$$\alpha^* = \theta - \arcsin(VZ/TAS)$$

where "VZ" represents the vertical air speed of the aircraft, "TAS" represents a true air speed of the aircraft, "$\theta$" represents a current longitudinal attitude of the aircraft, and "$\alpha^*$" represents the reference angle of attack, the device further comprises a set of means connected to the processor unit in order to determine the vertical air speed of the aircraft, the true air speed of the aircraft, and the current longitudinal attitude.

12. The device according to claim 10, the device further comprising adjustment means connected to the processor unit for adjusting the reference angle of attack ($\alpha^*$).

13. The device according to claim 10, the device further comprising a display connected to the processor unit to display at least one symbol illustrating the reference angle of attack ($\alpha^*$).

14. A rotary wing aircraft including at least one propulsion propeller, wherein the aircraft includes an autopilot device according to claim 10.

15. A method of automatically piloting a rotary wing aircraft having at least one propulsion propeller provided with a plurality of propulsion propeller blades configured to contribute to propulsion of the aircraft, a rotary wing independently operable from the propulsion propeller and having a main rotor provided with a plurality of main rotor blades, an adjustment mechanism having a servo-control arrangement configured to adjust pitch of the main rotor blades, a collective control system connected to the adjustment mechanism and configured to control a collective pitch of the main rotor blades via the adjustment mechanism, and a cyclic control system connected to the adjustment mechanism and configured to control a cyclic pitch of the main rotor blades via the adjustment mechanism, the method comprising:

operating by a pilot the propulsion propeller to adjust a longitudinal forward speed of the aircraft;

while the pilot is operating the propulsion propeller to adjust the longitudinal forward speed of the aircraft, automatically controlling, by a processor unit, the collective control system to control the collective pitch of the main rotor blades so as to control a vertical air speed of the aircraft such that the main rotor blades have a collective pitch in which an aerodynamic angle of attack ($\alpha$) of the aircraft is maintained equal to a reference angle of attack ($\alpha^*$);

operating by the pilot the cyclic control system to adjust the cyclic pitch of the main rotor blades to adjust a longitudinal attitude ($\theta$) of the aircraft while the pilot is operating the cyclic control system to adjust the longitudinal attitude ($\theta$) of the aircraft, automatically controlling, by the processor unit, the collective control system to control the collective pitch of the main rotor blades so as to control the vertical air speed of the aircraft such that the main rotor blades have a collective pitch in which the aerodynamic angle of attack ($\alpha$) of the aircraft is maintained equal to the reference angle of attack ($\alpha^*$);

automatically setting, by the processor unit, a value of the reference angle of attack ($\alpha^*$) to be equal to a current value of the aerodynamic angle of attack ($\alpha$) of the aircraft at the moment that the longitudinal attitude ($\theta$) of the aircraft or the longitudinal forward speed of the aircraft is adjusted by the pilot;

while the pilot is operating the cyclic control system so as to adjust the longitudinal attitude ($\theta$) of the aircraft, servo-controlling automatically, by the processor unit, a reference longitudinal attitude ($\theta^*$) of the aircraft to a current value of the longitudinal attitude ($\theta$) of the aircraft and, when the pilot is no longer acting on the cyclic control system, maintaining, by the processor unit, the longitudinal attitude ($\theta$) of the aircraft at the reference longitudinal attitude ($\theta^*$) of the aircraft; and wherein the longitudinal attitude ($\theta$) of the aircraft is equal to the sum of the aerodynamic angle of attack ($\alpha$) of the aircraft and an air-path slope of the aircraft, the air-path slope is dependent on the vertical air speed of the aircraft and a true air speed of the aircraft, and the true air speed of the aircraft is dependent on the longitudinal forward speed of the aircraft.

16. The method according to claim 15 further comprising:
modifying during flight of the aircraft the value of the reference angle of attack ($\alpha^*$) subsequent to the value of the reference angle of attack ($\alpha^*$) being set equal to the value of the aerodynamic angle of attack ($\alpha$) of the aircraft.

17. A method of automatically piloting a rotary wing aircraft having at least one propulsion propeller provided with a plurality of propulsion propeller blades configured to contribute to propulsion of the aircraft, a rotary wing independently operable from the propulsion propeller and having a main rotor provided with a plurality of main rotor blades, an adjustment mechanism having a servo-control arrangement configured to adjust pitch of the main rotor blades, a collective control system connected to the adjustment mechanism and configured to control a collective pitch of the main rotor blades via the adjustment mechanism, and a cyclic control system connected to the adjustment mechanism and configured to control a cyclic pitch of the main rotor blades via the adjustment mechanism, the method comprising:

operating by a pilot the propulsion propeller to adjust a longitudinal forward speed of the aircraft;

while the pilot is operating the propulsion propeller to adjust the longitudinal forward speed of the aircraft, automatically controlling, by a processor unit, the collective control system to control the collective pitch of the main rotor blades so as to control a vertical air speed of the aircraft such that the main rotor blades have a collective pitch in which an aerodynamic angle of attack ($\alpha$) of the aircraft is maintained equal to a reference angle of attack ($\alpha^*$);

operating by the pilot the cyclic control system for controlling a cyclic pitch of the main rotor blades to modify a longitudinal attitude ($\theta$) of the aircraft;

while the pilot is operating the cyclic control system for controlling the cyclic pitch of the main rotor blades so as to modify the longitudinal attitude ($\theta$) of the aircraft, servo-controlling automatically, by the processor unit, a reference longitudinal attitude ($\theta^*$) of the aircraft to a current value of the longitudinal attitude ($\theta$) of the aircraft and, when the pilot is no longer acting on the cyclic control system, maintaining, by the processor unit, the longitudinal attitude ($\theta$) of the aircraft at the reference longitudinal attitude ($\theta^*$) of the aircraft; and wherein the processor unit automatically controls the collective pitch of the main rotor blades so as to control the vertical air speed of the aircraft in such a manner as to maintain the aerodynamic angle of attack ($\alpha$) of the aircraft equal to the reference angle of attack ($\alpha^*$) by application of the following relationship:

$$\alpha^* = \theta - \arcsin(VZ/TAS)$$

where "VZ" represents the vertical air speed of the aircraft, "TAS" represents the true air speed of the aircraft, "$\theta$" represents a current longitudinal attitude, and "$\alpha^*$" represents the reference angle of attack.

* * * * *